United States Patent [19]
Hsu

[11] Patent Number: 6,041,393
[45] Date of Patent: Mar. 21, 2000

[54] ARRAY PADDING FOR HIGHER MEMORY THROUGHPUT IN THE PRESENCE OF DIRTY MISSES

[75] Inventor: Wei Hsu, Cupertino, Calif.

[73] Assignee: Hewlett-Packard Co., Palo Alto, Calif.

[21] Appl. No.: 08/704,218

[22] Filed: Aug. 23, 1996

[51] Int. Cl.[7] .................................................. G06F 12/06
[52] U.S. Cl. ............................. 711/157; 711/5; 711/173; 711/150; 365/230.03
[58] Field of Search .............................. 711/5, 118, 114, 711/157, 171, 129, 131, 148, 149, 150, 168, 173, 217, 218, 219, 220; 365/230.03

[56] References Cited

U.S. PATENT DOCUMENTS

| | | | |
|---|---|---|---|
| 4,439,827 | 3/1984 | Wilkes ..................................... | 712/235 |
| 5,341,489 | 8/1994 | Heiberger et al. ................. | 365/185.11 |
| 5,390,308 | 2/1995 | Ware et al. ................................. | 711/5 |
| 5,752,037 | 5/1998 | Gornish et al. ......................... | 395/709 |
| 5,761,468 | 6/1998 | Emberson ................................ | 395/383 |
| 5,761,718 | 6/1998 | Lin .......................................... | 711/137 |

OTHER PUBLICATIONS

Chi–Hung Chi, Kam–Kong Fang "Compiler Driven Data Cache Prefetching for High Performance Computers" Aug. 1994, IEEE, pp. 274–279.

Patterson, David A. and Hennessy, John L., Computer Architecture A Quantitative Approach, second edition, Morgan Kaufmann Publishers, Inc., San Francisco, California, 1996 (first edition 1990), pp. 405–411; 430–437.

Blainey, R. J., "Instruction Scheduling in the TOBEY compiler," IBM J. Res. Develop, vol. 38, No. 5, Sep. 1994, pp. 577–593.

Farkas, Keith I. and Jouppi, Norman P., Complexity/Performance Tradeoffs with Non–Blocking Loads, IEEE, 1994, pp. 211–222.

Mowry, Todd; Lam, Monica and Gupta, Anoop, "Design and Evaluation of a Compiler Algorithm for Prefetching," Proceedings of the Fifth International Conference on Architectural Support for Programming Languages and Operating Systems, Oct. 1992.

*Primary Examiner*—Hiep T. Nguyen

[57] ABSTRACT

An array padding technique is described that increases memory throughput in the presence of dirty misses. The technique pads arrays so that the starting addresses of arrays within a target loop are separated by P memory banks where P is a rounded integer equal to the number of memory banks divided by the number of arrays. The number of banks of separation can be incremented or decremented by 1 to also avoid path conflicts due to the sharing of buses in a typical hierarchical memory subsystem.

20 Claims, 3 Drawing Sheets

ARRAY PADDING FOR HIGHER MEMORY THROUGHPUT IN THE PRESENCE OF DIRTY MISSES

BACKGROUND OF THE INVENTION

This invention relates generally to computer systems and more particularly to memory arrangements within computer systems.

Modern microprocessors have a voracious appetite for memory. Unfortunately, memory speeds have not kept up with microprocessor speeds and the gap continues to widen.

Several techniques have been developed to address this performance gap. The first is called memory interleaving. An example of a memory interleave system is shown in FIG. 1. This system was initially developed and continues to predominate in vector computers. In this memory organization, the CPU is coupled to a plurality of banks, in this case 16 (bank 0–bank 15). A databus, typically 32 to 64 bits wide, is interconnected between the CPU and each of the banks so that each bank is connected in parallel. The banks themselves comprise either static random access memory(SRAM) or more likely dynamic random access memory (DRAM) given their higher densities.

Interleaved memory improves the bandwith of the memory system by accessing multiple banks simultaneously. Each successive bank, however, is given a successive address so that a successive number of words are accessed simultaneously. The CPU then reads (or writes) from the banks in a sequential order. Even though the CPU must wait the entire memory latency period for the first data elements, successive data elements can be read out at a much more rapid pace, thereby significantly improving the bandwith of the system over a strict linear memory organization.

This organization works particularly well for vector computers because they typically operate on large arrays that include sequential elements. Thus, for each memory access, the CPU can fetch an element from each of the banks. In the example shown in FIG. 1, the CPU can access sixteen elements of an array (e.g., 0–15) while incurring only a single latency for the first element while subsequent elements are provided at the maximum achievable bandwidth of the system. Subsequent group developments of the array can be provided by the interleaved memory system at the same throughput.

The performance of an interleaved memory system can be substantially degraded by certain access patterns. Consider the following Fortran code example:

```
Program EXAMPLE
Real *8 A (128, 128), P (128, 128)
. . .
Do 10 I = 1, 128
    Do 10 J = 1,128
        A (I, J) = A (I, J) + B (I, J) * 3.14
. . .
10  continue
```

In a vector computer, a vector load of A(I,J) produces a sequence of memory requests such as A (1, 1) A (1,2), A (1,3) . . . etc., to memory. This sequence of memory requests are addressed to the same memory bank (e.g., bank 0) because Fortran is a column major language for which stores are raised column by column, as compared to row major order which stores arrays row by row. Thus, the above-listed sequence of memory requests are separated by an entire column in physical memory, i.e., 128 double words. Since the column size is an integer multiple of the number of banks, the successive memory requests will go to the same bank. Accordingly, the memory bandwith would be significantly degraded and latency much increased.

There are two compiler techniques that can be used to effectively alleviate this contention for the same bank in traditional low order interleaving. The first is to interchange the loop variables so that successive memory requests are to successive physical memory locations. Using this technique, the above-listed Fortran code would be as follows:

```
Program EXAMPLE
Real *8 A (128, 128), P (128, 128)
. . .
Do 10 J = 1,128
    Do 10 I = 1,128
        A (I, J) = A (I, J) + B (I, J) * 3.14
. . .
10  continue
```

The optimized code now generates the sequence of memory requests such as A (1,1), A (2,1), A (3,1), . . . etc. These successive requests go to successive memory banks so that there is no contention for the same bank during a given vector load. Thus, the memory system can operate at its maximum bandwidth.

The second compiler technique to avoid bank conflict in traditional low order interleaving systems is to change the dimensions of the array so that successive memory requests do not go to the same bank. In the example above, the two arrays can be dimensioned as A (129, 128) and B (129, 128). In this case, consecutive elements in the array are separated by 129 double words, which is to the next consecutive bank (i.e., 129 mod 16=1).

Similar problems exist in high performance desktop systems, commonly referred to as "workstations," which use a different interleaving scheme. Workstations typically use a cache line interleaving memory system wherein consecutive cache lines are stored in consecutive banks. An example of this cache line interleaving is shown in FIG. 2. The cache line memory interleaving memory system in FIG. 2 assumes a cache line size of four consecutive double words. Accordingly, the first four double words (0–3) are stored in bank 0, the next four double words in bank 1 (4–7), etc.

The example loop shown above is often interchanged in the same way as for vector processors in order to exploit the spatial locality of cache lines. As long as there is a hit in the cache 11, the consecutive memory requests would be to consecutive elements in a cache line. When a miss occurs, however, this loop transformation may cause a performance degradation in the memory system. Assuming the loop variables are interchanged as shown above, the order of references is likely to be A (I, J) B (I, J), A (I+1, J), B (I+1, J) . . . , etc. If A (I, J) incurs a cache miss, then B (I, J) may also miss in the cache. In that case, the cache makes a memory request for A (I, J), which may be followed by a request for B (I,J). These two data elements, however, are located in the same bank. Hence, a bank conflict occurs which will delay the return of B (I, J).

Modern optimizing compilers avoid this bank conflict by spacing the two arrays out by one cache line so that a miss of an A reference and a miss of a B reference go to different banks. This is accomplished by declaring a dummy array between the two arrays in the example above where the dummy array has a size equal to one cache line so that the last element of the A array and the first element of the B array are separated by one cache line. This scheme works well in most situations. As will be described further below, however, I have discovered that this scheme creates bank conflicts in the presence of dirty misses. A dirty miss is a miss in a cache in which one or more elements in the corresponding victim cache line have been changed so that the contents of the cache line must be written back to main memory. This write-back causes the memory bank to be busy for many cycles. Accordingly, a need remains for an optimizing technique that deals with bank conflicts due to dirty misses.

A secondary search conflict can be attributed to data access path sharing. In a practical memory subsystem, such as shown in FIG. 3, memory banks are usually organized as a hierarchy rather than linearly interleaved as shown in FIGS. 1 and 2. A typical 16-bank memory subsystem may be organized as shown in FIG. 3. In that case, a CPU 10 is coupled to a master memory controller 12 via bus 14 over which data, control and address signals are transmitted. The master memory controller 12 determines which of its two main branches 28, 30 the memory request resides in and forwards the memory request onto that branch. Each branch, in this case, includes eight banks. The left hand branch 28 includes the even number banks and the right hand branch 30 includes the odd number banks. The even numbered banks are further subdivided so that half of the even numbered banks (0, 4, 8, and 12) are one grouping 16 while the remaining even banks are organized into a separate grouping 18. Each group of banks 16, 18 is coupled to a multiplexer 20 via a respective bus, A, B. Multiplexer 20 then transmits data from cache lines 28 to either one grouping or the other depending on the position of the multiplexer, as controlled by the master memory controller 12. Groupings 16 and 18 are controlled by slave memory controllers 22 and 24, respectively. The slave memory controllers receive control and address information from the master controller 12 and provide the corresponding data elements to the multiplexer 20 in response thereto. The right hand branch 30 is organized in substantially the same way and is therefore not discussed further.

This organization leads to a path conflict between banks that share a common bus. For example, in FIG. 3, banks 0, 4, 8 and 12 have a common sharing bus A. Thus, when bank 0 is accessed, bank 4 cannot respond immediately until the bus is released by bank 0. Accordingly, a need remains for an optimizing technique to deal with these path conflicts in hierarchical memory subsystem organizations.

SUMMARY OF THE INVENTION

I have discovered that the prevailing padding technique used in cache line interleaving memory systems leads to further bank conflicts in an event of a dirty miss. A dirty miss in a cache wherein the corresponding cache line has one or more dirty elements. These elements must therefore be written out to memory in order to maintain the consistency of the memory. Thus, a dirty miss produced both a read and a write request to the same bank. In most cases, these two requests will not create a bank conflict because the write can be delayed using a write buffer, for example. I have discovered, however, that this delayed write can, in fact, interfere with a memory reference of another array, not the array that produced the cache miss. This particular sequence of references can occur in connection with access to the arrays within a loop, as discussed below.

I have invented a padding technique that overcomes this problem by spacing the arrays out by a predetermined number of banks P, where P is a rounded integer equal to the number of banks (Nb) divided by the number of arrays (Na) that are likely to miss in the cache within the target loop. By spacing the arrays using this technique, the bank conflicts that can occur due to dirty misses are substantially eliminated. This new padding scheme achieves a higher memory throughput for cache-miss intensive programs. It can also significantly reduce the miss service time and, thus, greatly speed up programs.

In another aspect of the invention, the padding technique accommodates padding conflicts due to shared buses. According to this aspect of the invention, the above-described padding technique is modified so that the number of banks of separation (P) between two arrays (where P=Nb/Na, P is rounded integer) is incremented or decremented by 1 if the number of banks of separation (P) computed using the above-described technique is a multiple of the number of slave memory controllers (or alternatively, the number of sharing buses) (Nb). In this way, the padding technique accommodates both bank conflicts as well as path conflicts.

The foregoing and other objects, features and advantages of the invention will become more readily apparent from the following detailed description of a preferred embodiment of the invention which proceeds with reference to the accompanying drawings.

DETAILED DESCRIPTION

I have discovered that the conventional memory padding technique actually exacerbates the problem when the cache line is dirty. This conflict can significantly compromise performance since between thirty percent to fifty percent of cache misses are dirty. This bank conflict can be illustrated by the following example.

Figure 1:
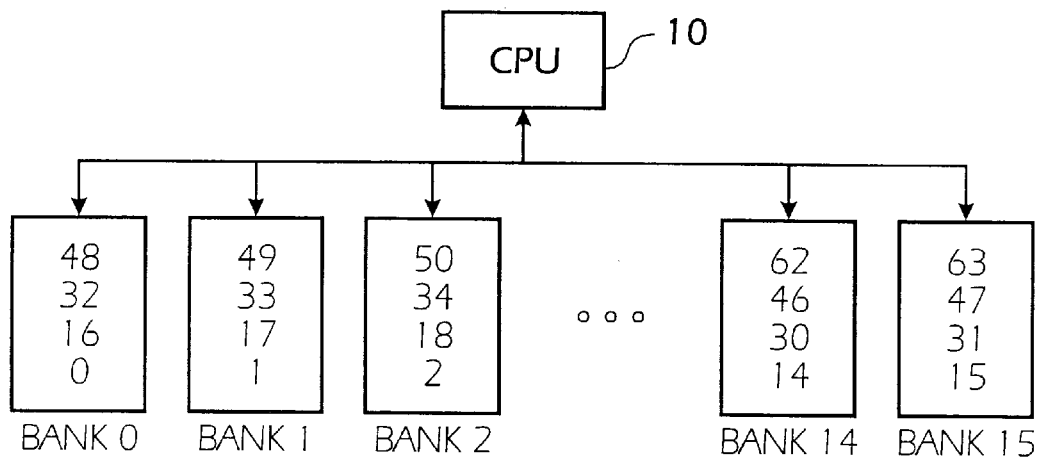
FIG. 1 is block diagram of a prior art computer system using traditional low order interleaving.
Figure 2:
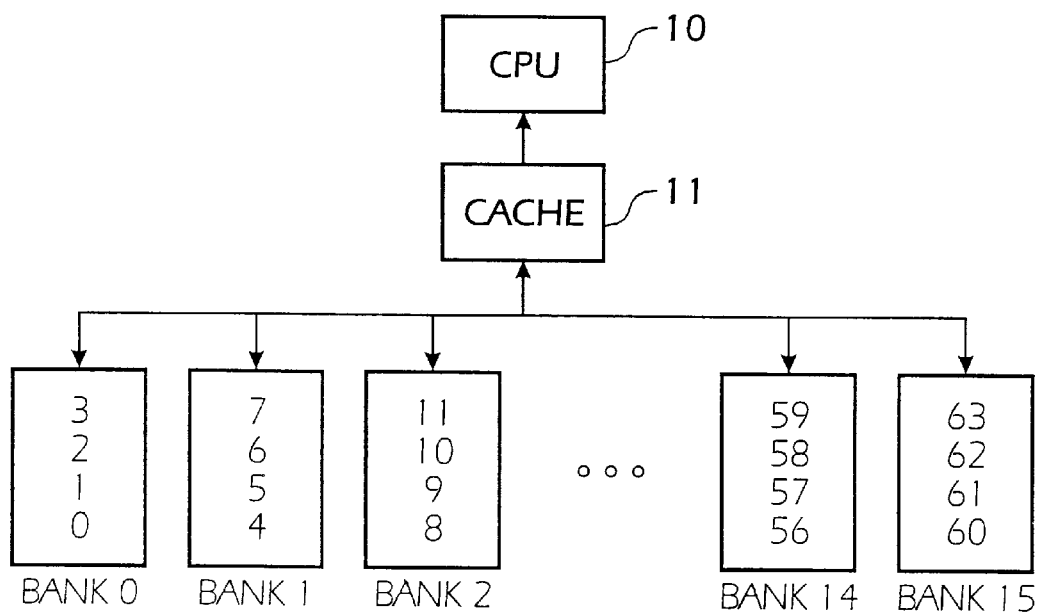
FIG. 2 is a block diagram of a prior art computer system having a cache line interleaved memory system.
Figure 3:
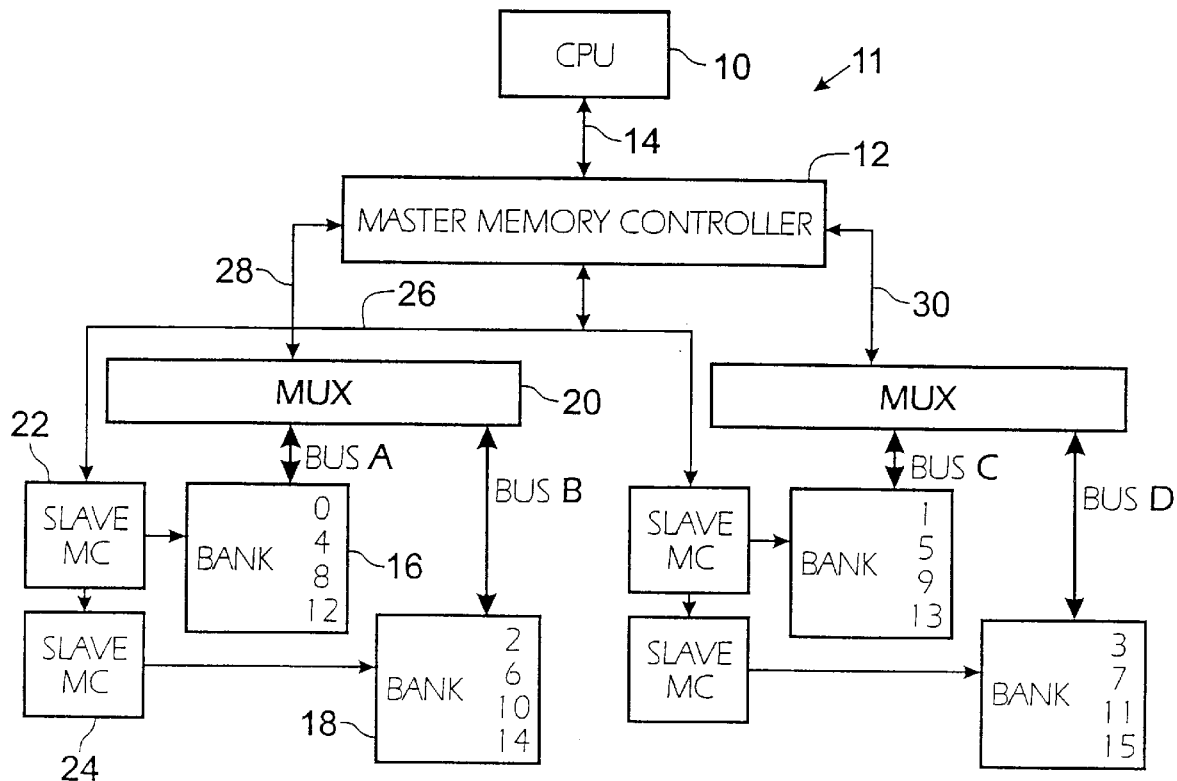
FIG. 3 is a block diagram of a prior art computer system using a hierarchial memory organization.

Assume in the system of FIG. 3 that array A starts at bank 1 and array B starts at bank 0 after padding by one cache line using the conventional memory padding technique. Assume now that a miss of A (I,J) is followed by a miss of B (I,J). If the miss of A (I,J) is a dirty miss, then bank 1 will be busy for two memory access times. Neither of these accesses will conflict with the reference B (I,J) because that reference is to bank 0 (at least initially). However, if the memory reference B (I+4, J) produces a miss four iterations later, this memory request will be to bank 1 which might still be servicing the two requests generated by the dirty miss. In most modern computer systems, the computer is able to execute four iterations of the loop faster than the memory bank can service two consecutive memory requests. Accordingly, it is very likely that the bank will be busy and, thus, a bank conflict is likely to occur. Even assuming the cache line is larger than four double words, the bank is still likely to be busy.

Figure 4:
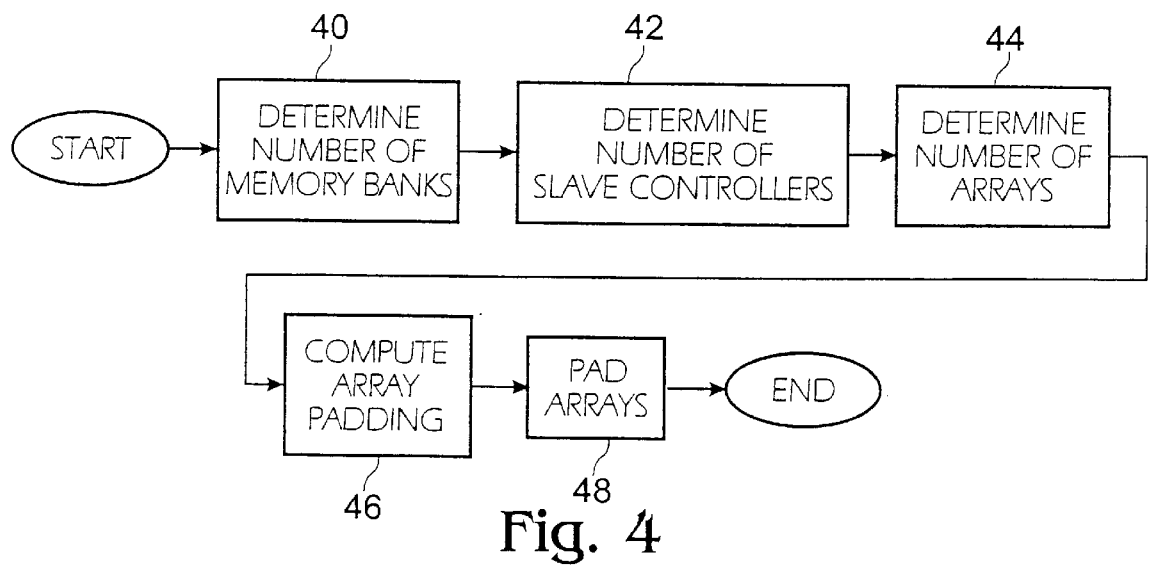
FIG. 4 is a flow chart showing the memory padding technique according to the invention to improve operation of the system of FIG. 3.
Figure 5:
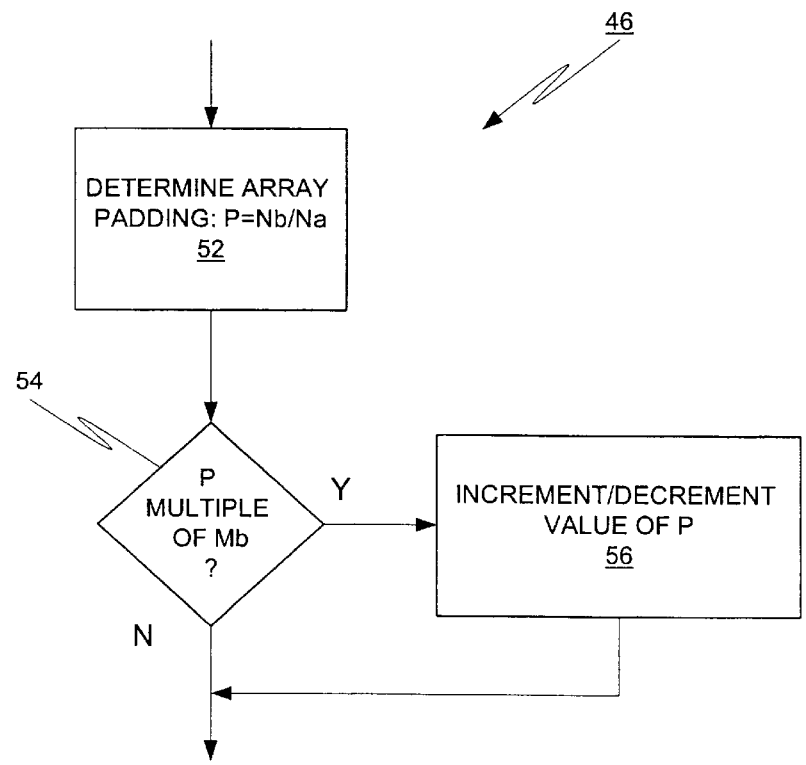
FIG. 5 is a flow chart illustrating an embodiment of the step COMPUTE ARRAY PADDING in FIG. 4.
Figure 6:
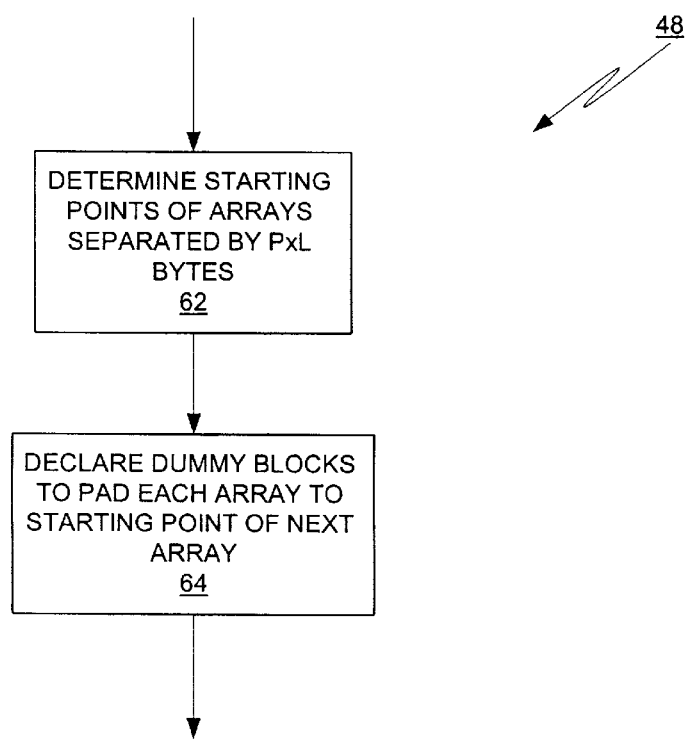
FIG. 6 is a flow chart illustratingan embodiment of the step PAD ARRAYS in FIG. 4.

The memory padding technique according to the invention is shown at FIG. 4. This technique pads arrays so as to accommodate or avoid bank conflicts due to dirty misses. Although described with reference to the system of FIG. 3, this invention can be used in computer systems with a variety of architectures.

The padding technique includes the following steps. First, a compiler in CPU determines the number of memory banks in the system (FIG. 4, step 40). This can either be a fixed number for a given computer implementation or, alternatively, the compiler could poll a predetermined memory location which stores the number of memory banks in the system that is set when the computer system is initially booted and/or configured.

Once the number of memory banks is known, the compiler next determines the number of slave controllers (step 42). This can be determined in the same way as the number of banks. Alternatively, the number of sharing buses can be used (i.e., buses A–D in FIG. 3). The number of slave controllers (Mb) is used to avoid path conflicts while the number of memory banks (Nb) is used to avoid bank conflicts due to dirty misses.

In step 44, the compiler determines the number of arrays that are likely to miss in a given target loop. These are arrays that are typically larger and are more likely to exceed the cache size and require cache prefetches to external memory.

The amount of array padding is then computed in step 46. The number of banks of separation (P) is initially computed according to the following formula: P=Nb/Na, where Nb is the number of banks, Na is the number of arrays, and P is rounded integer. This produces the maximum separation between the arrays, i.e., the arrays are spaced equally out within the memory banks. This separation avoids most bank conflicts due to dirty misses. However, there can still be path conflicts due to the sharing of buses. The padding technique according to the invention avoids these path conflicts by changing P by 1, either by incrementing or decrementing P by 1, if P is a multiple of the number of slave memory controllers (or the number of sharing buses). By so modifying P, the padding technique according to the invention addresses both bank conflicts due to dirty misses as well as path conflicts due to shared buses.

Finally, in step 48, the compiler pads the arrays in accordance with the number of banks of separation calculated in step 46. The padding is done so that the starting points of the arrays are separated by P banks, i.e., P×Ls bytes, where Ls is the number of bytes in the cache line where each bank is interleaved by one cache line. This padding is accomplished by declaring a dummy block or array of sufficient size so that the starting addresses of the arrays are separated by P banks.

The above-described padding technique can be implemented using conventional computer programming techniques based on the description contained herein. These steps can be readily integrated into the compiler disclosed in the copending, commonly-assigned patent application Ser. No. 08/704,359, filed simultaneously herewith by Wei Hsu and Loren Staley, entitled OPTIMIZING COMPILER HAVING DATA CACHE PREFETCH SPREADING, issued Dec. 29, 1998 as U.S. Pat. No. 5,854,934, incorporated by reference herein. Alternatively, this technique can be implemented independently of the compiler, for example, in an application program or in middleware.

The new padding technique overcomes the problem of the prior art array padding technique in the case of dirty misses as well as addressing the path conflict problems inherent in many computer systems. The description above used certain word sizes, certain number of memory banks and certain cache line size. The invention, however, is not limited to the particular dimensions used in these illustrations. Instead, the array padding technique according to the invention can be modified for different forms of interleaving, different cache line size, and various cache organizations without departing from the scope of the invention.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A method of increasing memory throughput in a computer system which includes a CPU with a cache and an interleaved memory system, the method comprising:

determining a number of memory banks (Nb) in the memory system;

identifying a number of arrays (Na) in a loop in a program to be executed on the CPU;

determining a cache line size (Ls) of the cache;

determining a spacing among a number of arrays to be stored in the memory system according to the number of memory banks (Nb), the number of arrays (Na) to be accessed in the loop, and the cache line size (Ls); and padding the arrays by the array spacing.

2. The method of increasing memory throughput in a memory system according to claim 1 wherein the step of determining an array spacing according to the number of memory banks (Nb), the number of arrays (Na), and the cache line spacing (Ls) includes computing P=Nb/Na.

3. The method of increasing memory throughput in a memory system according to claim 2 wherein the step of padding the arrays by the array spacing includes shifting a starting point of each array so that the arrays are separated by P banks.

4. The method of increasing memory throughput in a memory system according to claim 3 wherein the step of shifting a starting point of each array so that the arrays are separated by P banks includes shifting the starting point of each array by P×Ls number of bytes.

5. The method of increasing memory throughput in a memory system according to claim 2 wherein the step of padding the arrays by the array spacing includes declaring a dummy block of memory equal to P×Ls number of bytes.

6. The method of increasing memory throughput in a memory system according to claim 2 further including the step of determining a number of slave memory controllers (Mb) in the memory system.

7. The method of increasing memory throughput in a memory system according to claim 6 further including the step of changing the quantity P by one if P is a multiple of the number of slave memory controllers Mb.

8. The method of increasing memory throughput in a memory system according to claim 2 further including the step of determining a number of sharing buses (Mb) in the memory system.

9. The method of increasing memory throughput in a memory system according to claim 8 further including the step of changing the quantity P by one if P is a multiple of the number of sharing buses Mb.

10. A computer having an interleaved memory system, comprising:

a central processing unit (CPU) operable to execute a program which includes a program loop;

a cache operatively coupled to the CPU having a plurality of cache lines, each line having a line size (Ls);

a plurality of memory banks (Nb) operatively coupled to the cache in order to provide data to the cache in response to a read request from the cache and to receive data from the cache in response to a write request therefrom; and a plurality of arrays (Na) stored in the memory banks to be accessed in the program loop, each array having a plurality of sequential elements beginning with a first element, wherein the first elements of the arrays are spaced out at intervals of approximately P (P=Nb/Na) among the memory banks so as to avoid contention for a memory bank between two accesses to the same memory bank.

11. A computer having an interleaved memory system, comprising:

a central processing unit (CPU);

a cache operatively coupled to the CPU having a plurality of cache lines, each line having a line size (Ls);

a plurality of memory banks (Nb) operatively coupled to the cache in order to provide data to the cache in response to a read request from the cache and to receive data from the cache in response to a write request therefrom;

a plurality of arrays stored in the memory banks, each array having a plurality of sequential elements beginning with a first element, wherein the first elements of the arrays are spaced out approximately equally among the memory banks so as to avoid contention for a memory bank between two accesses to the same memory bank;

means for determining the number of arrays (Na) within a target loop;

means for determining a padding factor (P), wherein the padding factor is a function of the number of arrays (Na) and the number of memory banks (Nb); and means for spacing the arrays out among the banks responsive to the padding factor.

12. The computer according to claim 11 wherein the means for spacing the arrays out among the banks in accordance with the padding factor includes means for spacing the first elements of the arrays out by P×Ls bytes.

13. The computer according to claim 11 wherein the means for determining a padding factor (P) includes means for calculating P=Nb/Na as a rounded integer.

14. The computer according to claim 11 including:

a plurality of slave controllers;

means for determining a number of slave memory controllers (Mb); and means for changing quantity P by one if P is a multiple of Mb.

15. A computer having an interleaved memory system comprising:

a central processing unit (CPU);

a cache having a plurality of cache lines operatively coupled to the CPU, each cache line having a cache line size (Ls);

a plurality of memory banks (Nb) operatively coupled to the cache;

means for identifying a number of arrays (Na) in a program loop to be executed on the CPU; and means for storing the arrays in the plurality of memory banks so that the arrays are separated by more than one cache line.

16. The computer according to claim 15 wherein the means for storing the arrays in the plurality of memory banks so that the arrays are separated by more than one cache line includes means for storing the arrays in the plurality of memory banks so that the arrays are separated by two cache lines.

17. The computer according to claim 15 wherein the means for storing the arrays in the plurality of memory banks so that the arrays are separated by more than one cache line includes means for storing the arrays in the plurality of memory banks so that the arrays are separated by Nb/Na cache lines.

18. The computer according to claim 15 including:

a plurality of slave controllers;

means for determining a number of slave memory controllers (Mb); and means for storing the arrays in the plurality of memory banks so that the arrays are separated by (Nb/Na)+1 cache lines if Nb/Na is a multiple of Mb.

19. The computer according to claim 15 including:

a plurality of slave controllers;

means for determining a number of slave memory controllers (Mb); and means for storing the arrays in the plurality of memory banks so that the arrays are separated by (Nb/Na)−1 cache lines if Nb/Na is a multiple of Mb.

20. The computer according to claim 15 wherein the means for storing the arrays in the plurality of memory banks so that the arrays are separated by more than one cache line includes a compiler that includes means for allocating a dummy array having a size equal P×Ls bytes between each array so as to space the arrays apart by P×Ls bytes.

* * * * *